Sept. 26, 1939.  C. STANSBURY  2,173,921
WELDING TIMER
Filed Sept. 11, 1936  2 Sheets-Sheet 1

Inventor
Carroll Stansbury
By Frank H. Hubbard
Attorney

Sept. 26, 1939.　　　C. STANSBURY　　　2,173,921
WELDING TIMER
Filed Sept. 11, 1936　　　2 Sheets-Sheet 2
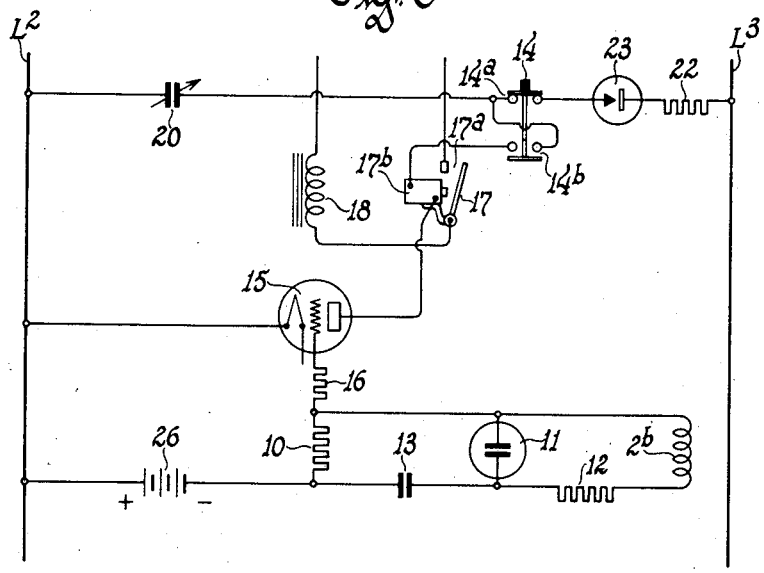
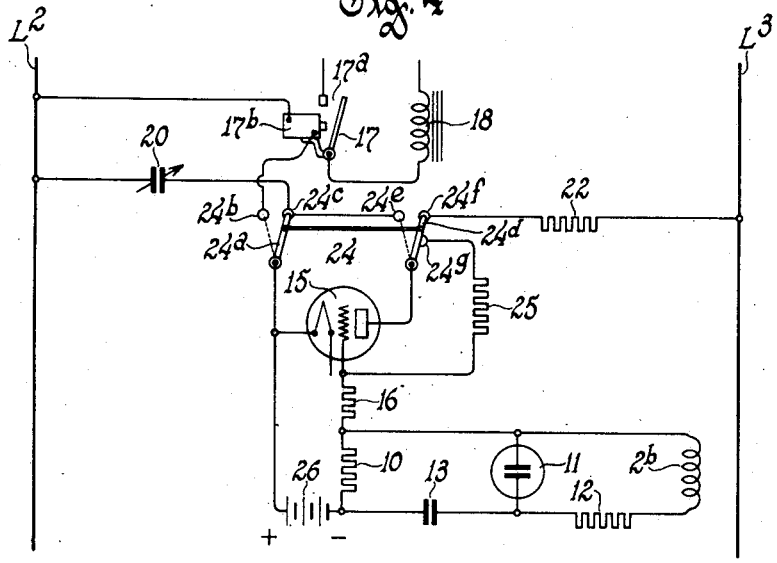
Inventor
Carroll Stansbury
By Frank H. Hubbard
Attorney Patented Sept. 26, 1939

2,173,921

UNITED STATES PATENT OFFICE 2,173,921

WELDING TIMER

Carroll Stansbury, Wauwatosa, Wis., assignor to Cutler-Hammer, Inc., Milwaukee, Wis., a corporation of Delaware Application September 11, 1936, Serial No. 100,279

12 Claims. (Cl. 175—375)

This invention which is a continuation in part of my co-pending application, Serial No. 96,195, filed August 15, 1936, relates to an electric timer and is particularly applicable to electric welding systems or the like, in which a current impulse of very short duration is to be supplied to the welding apparatus.

More particularly the invention relates to the control of a welding current supplied from an alternating source, whereby the duration of current flow is only a fraction or a very few cycles of the alternating current, and an object of the present invention is to provide a controller adapted for accurate adjustment of such current flow.

Another object of the invention is to provide novel means for accurately timing the periods of current supply of extremely short duration to a translating device.

Another object is to provide a controller in which the flow of current in a circuit is started at a selected moment of an alternating current cycle.

Another object is to provide for the supply of an accurately measured amount of electrical energy to a translating device.

Other objects and advantages will hereinafter appear.

In the accompanying drawings,

Fig. 3 is a modification of the system shown in Fig. 1, wherein the source of direct current is a condenser, while Fig. 4 is still another modification and in certain aspects a simplification of the system illustrated in Fig. 3.

Figure 1:
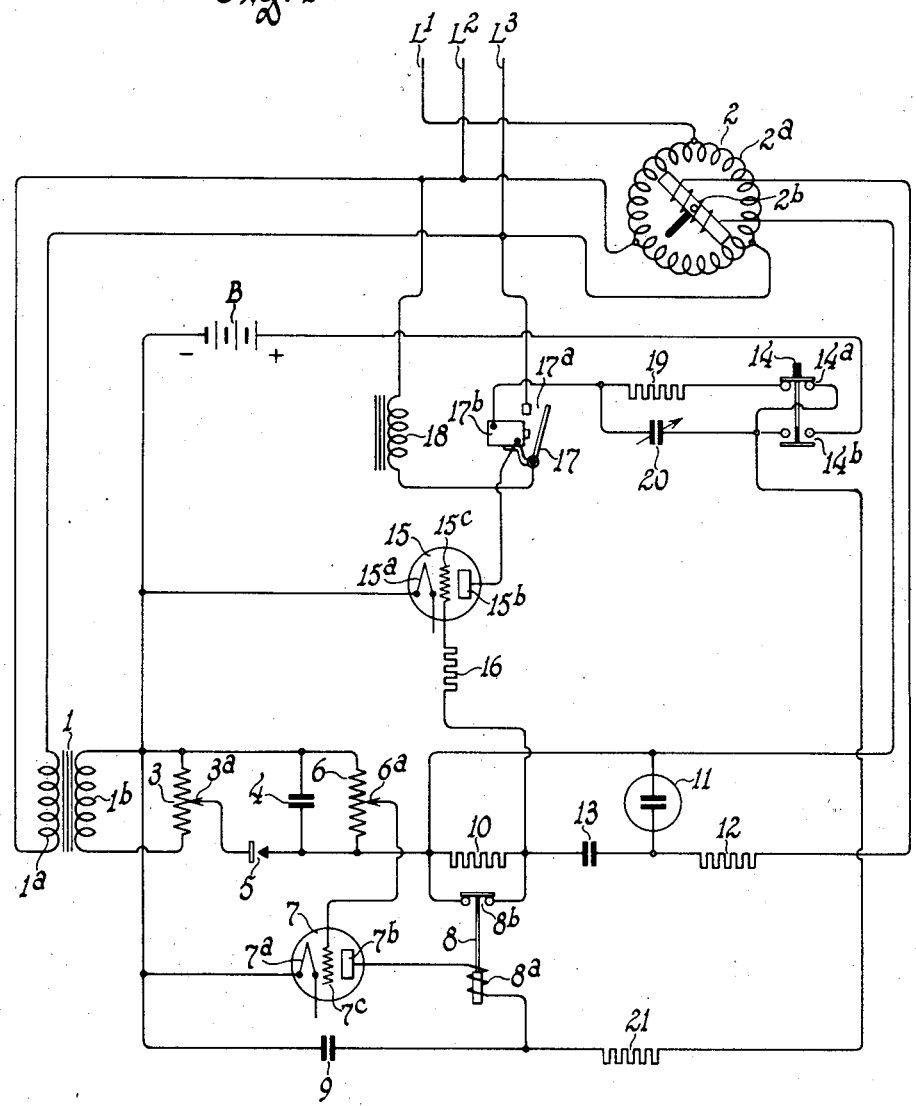
Figure 1 illustrates diagrammatically one embodiment of my invention, wherein a direct current source supplies a magnetic switch controlling an alternating welding current.

Referring to Fig. 1, $L^1$, $L^2$ and $L^3$ are the terminals of a three-phase alternating current supply source, while B is a source of unidirectional potential such as a storage battery, which, however, may be displaced by any other well known means for supplying a direct current. A transformer 1 has a primary winding $1^a$ connected to the lines $L^2$ and $L^3$. A phase shifting transformer 2 has a three-phase primary winding $2^a$ connected to the three terminals of the alternating current supply and a single phase secondary winding $2^b$ supplies an alternating voltage whose phase can be adjusted relative to a voltage of the alternating supply in a well known manner by rotation of said secondary winding.

A secondary winding $1^b$ of the transformer 1 supplies energy to a voltage divider 3, provided with an adjustable contact $3^a$. A condenser 4 is connected in series with a rectifier 5 between one end terminal of the voltage divider 3 and the contact $3^a$. A second voltage divider 6 having an adjustable contact $6^a$ is connected between said aforementioned terminal and the common point of the condenser 4 and rectifier 5. Said aforementioned common terminal is also connected to the negative pole of the battery B. A gaseous electron tube 7 has its cathode $7^a$, which may be heated in any well known manner, connected to the negative pole of the battery B. The grid $7^c$ of said tube is connected to the contact $6^a$. An anode $7^b$ of said tube is connected to one terminal of the winding $8^a$ of an electromagnetic relay 8, the other terminal of said winding being connected in series with a condenser 9 to the negative pole of the battery B. The relay 8 is also provided with normally closed contacts $8^b$ which are bridged by a resistor 10.

The secondary winding $2^b$ of the phase shifting transformer 2 is connected in series with a gaseous tube 11 and a resistor 12. A condenser 13 is inserted between the common point of resistor 12 and tube 11 and one of the contacts $8^b$. The other contact $8^b$ is connected to the common point of the divider 6, condenser 4 and rectifier 5 and also to the common point of tube 11 and winding $2^b$.

The system also comprises a pilot switch 14 having normally closed bridging contacts $14^a$ and normally open bridging contacts $14^b$. A gaseous electron tube 15 has a cathode $15^a$, which may be heated in any well known manner, connected to the negative pole of the battery B. A grid $15^c$ of said tube is connected in series with a resistor 16 to the common point of condenser 13 and resistor 10. An electromagnetic switch 17 has normally open contacts $17^a$ which are adapted to connect the primary winding 18 of a welding transformer across the lines $L^2$ and $L^3$. The switch has a coil $17^b$ which has one terminal connected to an anode $15^b$ of tube 15, while the other terminal is connected in series with a resistor 19 to one terminal of the normally closed contacts $14^a$. An adjustable condenser 20 has one plate connected to the common point of coil $17^b$ and resistor 19, while the other plate is connected through a resistor 21 to the common point of coil 8 and condenser 9. The latter plate is also connected to one terminal of contacts $14^b$ and the free terminal of contacts $14^a$. The second terminal of contacts $14^b$ is connected to the positive pole of battery B.

The system Fig. 1 functions as follows: If the lines $L^1$, $L^2$ and $L^3$ are energized and the tubes 7 and 15 are heated, the pilot switch 14 may be operated to close contacts $14^b$ and open contacts $14^a$. This impresses the voltage of battery B upon a circuit comprising tube 15, coil $17^b$ and variable condenser 20. However, no current can flow, because the grid $15^c$ is more negative than the critical potential of the tube 15. This grid bias results from the following facts: A suitable alternating potential is induced in the secondary winding 1b and a fraction of such potential which depends upon the adjustment of the contact 3a is impressed upon the rectifier 5 and condenser 4, with the result that the latter is charged to a unidirectional potential which in turn is impressed upon the voltage divider 6. A fraction of the last named potential is impressed upon the grid 7c of tube 7, the value being sufficiently negative to normally block tube 7.

The closure of contact 14b closes a circuit from the positive pole of the battery, through resistor 21 and condenser 9 to the negative pole. This charges condenser 9 to a potential which exceeds that plate potential of tube 7 for which the tube can be blocked by the existing negative grid potential. Tube 7 thereupon becomes conducting and energizes relay 8, which latter opens contacts 8a. The opening of these contacts inserts the resistance 10 in series with the condenser 13 across the tube 11. The transformer winding 2b impresses an alternating voltage on tube 11 which at a given moment of the cycle causes the tube to pass a current. This current varies the charge of condenser 13, and as fully explained in my aforementioned application, a very steep voltage wave is impressed upon the grid 15c which causes tube 15 to pass current at a moment of the alternating voltage wave determined by the adjustment of the transformer 2. When tube 15 becomes conducting a current flows through winding 17b and charges condenser 20. Switch 17 closes the circuit of transformer 18 which supplies current to the weld. After condenser 20 has been fully charged, current flow in winding 17b ceases and the transformer is again disconnected. No further operation of switch 17 can take place until pilot switch 14 is released to close contacts 14a and open contacts 14b, whereupon condenser 20 is discharged through resistor 19 and the circuit of tube 15 is opened.

The interval during which the welding circuit is closed may be adjusted by varying the capacity of the condenser 20. Thus by varying this interval and by accurately adjusting the moment at which the switch 17 is energized, the amount of energy supplied to the weld may be accurately determined, while arcing of the contacts of the switch 17 incident to the opening of the circuit may be greatly reduced and practically eliminated by the proper timing of the closing moment so that the alternating welding current just passes through zero at the moment at which the switch opens its contacts.

Figure 2:
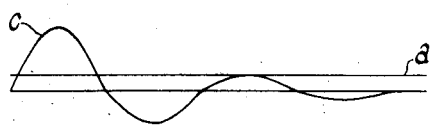
Fig. 2 illustrates certain phenomena of the current flowing in the switch coil of the system shown in Fig. 1.

In Fig. 2 the line a represents the current in the coil 17b at which the contactor closes. Condenser 20 and coil 17b are so selected that if connected in circuit with a direct current supply, damped oscillations of current would result. Such oscillations would be of the general character indicated by curve C of Fig. 2. However, since the tube 15 is connected in series with coil 17b and condenser 20, such oscillations can only persist during the first positive pulse provided the grid voltage is of such a value as to permit conduction of current through the tube. The nature of this pulse of current is such as to provide for a substantially maximum rate of change at the initial and final instants of current flow, resulting in rapid and positive energization and de-energization and resulting movement of the contactor magnet in both closing and opening.

Fig. 3 illustrates a modification of the system Fig. 1, wherein the energy for actuating the switch 17 is supplied from the alternating current terminals L2 and L3 of the three phase line L1, L2 and L3, but said energy may be supplied from any other suitable source. In the system as shown an adjustable condenser 20 is charged in series with a rectifier 23 and a resistance 22 as long as the normally closed contacts 14a of pilot switch 14 are closed. Normally a negative grid potential which is sufficient to prevent conduction of tube 15 is impressed upon grid 15c by a battery 26. A peaked positive potential is induced in the resistor 10 in the manner aforedescribed in connection with Fig. 1 during each positive cycle of the alternating supply voltage. The positive potential is superposed upon the aforementioned negative grid bias and is of such value as to produce a resultant grid potential, which at the desired moment permits the tube to conduct and thus pass energizing current through the winding of switch 17. If it is desired to energize the switch 17, the pilot switch 14 is operated in the manner aforedescribed, whereupon the condenser 20 is disconnected from the line and connected in series with the coil 17b and the tube 15, the latter being controlled as to the moment of starting of current flow, as explained in connection with Fig. 1. The interval during which the switch is energized is regulated by adjustment of the condenser. While coil 17b and condenser 20 again represent a system capable of oscillating, such oscillation is prevented by the unilateral conduction of tube 15, as has been explained before.

Fig. 4 is still another modification in which the tube 15 is in circuit with the condenser 20 both for charging and discharging of the latter. A double pole double throw pilot switch 24 has a blade 24a which engages in the charging position contact 24c and in the discharging position contact 24b, while a second blade 24d engages in the charging position, contacts 24f and 24g and in the discharging position contact 24e. In the charging position the grid of tube 15 is connected to the anode through a current limiting resistor 25, so that it has no controlling effect on the tube. The condenser 20 receives a charge from the line as previously explained. If now the pilot switch is thrown to the discharging position, the tube connects the condenser to the switch 17 and a current is passed through the latter to close it, as will be apparent; the control of the moment of starting being the same as explained in connection with the systems shown in Figs. 1 and 2.

In the system, Fig. 1, the bias voltage is supplied by the voltage divider 6 and the transformer 1, while in Figs. 3 and 4 it is obtained from a battery 26. It is, of course, understood that any other suitable source may be substituted therefor.

While the welding transformer current is shown to be controlled by an electromagnetic switch, it will be obvious that it might be controlled by a saturable reactor whose saturating winding is connected into the circuit in place of the winding 17b. Furthermore, it is possible to replace the electron tube illustrated in the several figures by other rectifying means, for example, by a synchronously rotating commutator, which closes the circuit at a given moment of the alternating cycle and interrupts it after a given interval, so that the current flowing in the coil of the electromagnetic device is limited to substantially a single unidirectional pulse. If current should flow in the coil in the reverse direction after the first pulse, said current must be sufficiently low so as not to cause a second response of the electromagnetic device. Many other obvious modifications which are within the scope of the present invention will suggest themselves to one skilled in the art, and the appended claims are to be construed to encompass such modifications and are to be limited only by the prior art.

What I claim as new and desire to secure by Letters Patent is:

1. The combination with an electric circuit of an electromagnetic device having an energizing coil, an energy storage circuit, means to charge said storage circuit, including means to modify said charge and to energize said device by current derived from a modification of said charge, and means to limit the effective current between said storage circuit and said coil to substantially a single unidirectional pulse.

2. In combination, an electric circuit, a condenser, an electromagnetic device having an energizing coil, means to charge said condenser with energy derived from said circuit and to pass current through said coil resulting from a change of the quantity of energy stored in said condenser, said last mentioned means including electronic means for controlling the moment of starting current flow through said coil and means to regulate the duration thereof.

3. In combination, a source of electric energy, a translating circuit, an electromagnetic control device for the latter having an energizing coil, a condenser, means to charge said condenser, including means to produce an exchange of energy between said condenser and said coil, the current resulting from said exchange having a tendency to oscillate, and means for controlling the moment of starting the flow of current in said coil and for limiting the effective flow thereof to substantially a single unidirectional pulse.

4. In combination with an electric circuit, an electromagnetic device having an energizing coil, a condenser, means to connect said condenser to said circuit and to charge the same with energy derived therefrom, including electronic means to connect said coil and said condenser in series, to energize said coil, said electronic means also including means to control the moment of starting current flow therethrough and means to regulate the duration thereof.

5. The combination with an electric circuit, of an electromagnetic device having an energizing coil, a condenser, means to charge said condenser by energy derived from said circuit, an electronic tube having a cathode, an anode and a grid, means to connect said cathode and anode in series with said condenser and said coil, an alternating current supply, means to impress upon said grid an instantaneous voltage derived from said alternating current supply to permit conduction through said tube, and means to control the moment of impressing said voltage relative to the time phase of the voltage of said alternating current.

6. In combination, a source of alternating current, a translating device, an electromagnetic switch for controlling the supply of current from said source to said device and having an energizing coil, a supply of direct current, a condenser connected in circuit with said coil to afford a rapidly rising initial current flow therethrough, an electron tube having a control element, means to connect said condenser, said coil and said tube in circuit with said supply, and means connected to said control element for starting current flow in said coil at a given moment in the cycle of the alternating current.

7. In combination, a source of alternating current, a control device therefor, having an energizing coil, a circuit including said coil and a condenser, means to supply electric energy to said circuit, said energy having a tendency to oscillate and means for controlling the starting of flow of said energy at a given moment in the cycle of said alternating current and for limiting the effective flow thereof to substantially a single unidirectional pulse.

8. In combination, a source of electric energy, a translating circuit, an electromagnetic control device for the latter, having an energizing coil, a condenser in series with said coil, means to charge said condenser by a unidirectional current and to energize said coil by the current supplied to said condenser, means to limit the effective current in said coil to substantially a single unidirectional pulse and means for controlling the moment of starting the flow of current in said coil.

9. In combination, a source of electric energy, a translating circuit, an electromagnetic control device for the latter, having an energizing coil, a condenser in series with said coil, means to charge said condenser by a unidirectional current and to energize said coil by the current supplied to said condenser, including means to limit the effective current in said coil to substantially a single unidirectional pulse and means for starting the flow of current in said device at a given moment of said alternating current.

10. In combination, a source of alternating current, a translating circuit supplied therefrom, an electromagnetic control device for the latter having an energizing coil, a condenser, means to charge said condenser by a unidirectional current derived from said source and to energize said coil by the current supplied to said condenser, an electronic tube connected in circuit with said coil and said condenser to rectify the current flowing therebetween, and means for starting the flow of current in said coil at a given moment of the cycle of said alternating current.

11. In combination, an alternating current supply, a condenser, a rectifier, an electromagnetic device having an energizing coil, an electron discharge tube connected in series with the latter, means to connect said condenser and said rectifier in series across said supply to charge the former, means to commutate said connection and to connect said coil in series with said tube across said condenser to discharge the latter, and means to start said discharge at a given moment in the cycle of said alternating current.

12. In combination, an alternating current supply, a condenser, an electromagnetic device having an energizing coil, an electron tube having a cathode, an anode and a grid, means to connect said condenser in series with said tube across said supply to charge said condenser, means to commutate said connection and to connect said condenser in series with said coil and said tube to energize said coil by a discharge current from said condenser, and means connected to said grid to start flow of said discharge current at a given moment in the cycle of said alternating current.

CARROLL STANSBURY.